(12) United States Patent
Kujubu et al.

(10) Patent No.: US 11,878,592 B2
(45) Date of Patent: Jan. 23, 2024

(54) CONTROL METHOD FOR ELECTRIC VEHICLE AND CONTROL DEVICE FOR ELECTRIC VEHICLE

(71) Applicant: Nissan Motor Co., Ltd., Yokohama (JP)

(72) Inventors: Naoteru Kujubu, Kanagawa (JP); Ikuma Shindo, Kanagawa (JP); Tatsuya Suzuki, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 608 days.

(21) Appl. No.: 16/479,505

(22) PCT Filed: Jan. 24, 2017

(86) PCT No.: PCT/JP2017/002384
§ 371 (c)(1),
(2) Date: Jul. 19, 2019

(87) PCT Pub. No.: WO2018/138781
PCT Pub. Date: Aug. 2, 2018

(65) Prior Publication Data
US 2019/0381894 A1 Dec. 19, 2019

(51) Int. Cl.
*B60L 15/20* (2006.01)
*B60L 50/51* (2019.01)

(52) U.S. Cl.
CPC .......... *B60L 15/2018* (2013.01); *B60L 15/20* (2013.01); *B60L 15/2027* (2013.01); *B60L 50/51* (2019.02); *B60L 2240/16* (2013.01)

(58) Field of Classification Search
CPC .. B60L 15/2018; B60L 16/20; B60L 2240/16; B60L 15/20
(Continued)

(56) References Cited

U.S. PATENT DOCUMENTS 5,980,413 A * 11/1999 Anderson ............. F16H 61/702
475/198
6,427,108 B1 * 7/2002 Kanasugi .......... F16H 61/66254
477/118
(Continued)

FOREIGN PATENT DOCUMENTS

JP 2000205015 A 7/2000
JP 2008-049836 A 3/2008
(Continued)

*Primary Examiner* — Jacob S. Scott
*Assistant Examiner* — Michael E Butler
(74) *Attorney, Agent, or Firm* — Young Basile Hanlon & MacFarlane, P.C.

(57) ABSTRACT

A control method for an electric vehicle controls braking force when the accelerator operation amount is less than a prescribed value and controls drive force when the accelerator operation amount is at least a prescribed value. The electric vehicle control method estimates disturbance torque that acts on the motor as a resistance component relating to gradient; and executes correction whereby the braking force or the drive force is increased/decreased on the basis of the disturbance torque estimated value, such that the resistance component is negated. A determination is made regarding whether or not the accelerator operation amount is a partial equivalent amount and, if at least either the accelerator operation amount on a downhill road is greater than the partial equivalent amount or the accelerator operation amount on an uphill road is less than the partial equivalent amount, the correction amount is reduced.

10 Claims, 16 Drawing Sheets

(58) Field of Classification Search
USPC .......................................................... 701/22
See application file for complete search history.

(56) References Cited

U.S. PATENT DOCUMENTS

| | | | |
|---|---|---|---|
| 8,078,348 B2* | 12/2011 | Saitoh | B60L 58/40 |
| | | | 701/22 |
| 2008/0108477 A1* | 5/2008 | Noll | B60K 31/04 |
| | | | 477/23 |
| 2010/0326402 A1* | 12/2010 | Fujikawa | G10K 15/02 |
| | | | 123/399 |
| 2014/0005869 A1 | 1/2014 | Kubotani et al. | |
| 2014/0350759 A1 | 11/2014 | Kobayashi et al. | |
| 2015/0222209 A1* | 8/2015 | Crisp | B60W 30/18127 |
| | | | 318/376 |
| 2016/0347202 A1* | 12/2016 | Sawada | B60L 15/20 |

FOREIGN PATENT DOCUMENTS

| | | |
|---|---|---|
| JP | 201111648 A | 1/2011 |
| JP | 201411882 A | 1/2014 |
| WO | 2013084624 A1 | 6/2013 |
| WO | 2015105077 A1 | 7/2015 |

* cited by examiner

US 11,878,592 B2

CONTROL METHOD FOR ELECTRIC VEHICLE AND CONTROL DEVICE FOR ELECTRIC VEHICLE

TECHNICAL FIELD

The present invention relates to a control method for an electric vehicle and a control device for an electric vehicle.

BACKGROUND

There is a known technology in an vehicle acceleration/deceleration control system by which deceleration is controlled in accordance with an accelerator operation amount when the accelerator operation amount is smaller than a given value, and acceleration is controlled in accordance with an accelerator operation amount when the accelerator operation amount is the given value of larger (see JP2000-205015A). With the acceleration/deceleration control system, it is possible to set target acceleration/deceleration in accordance with an accelerator operation amount. Therefore, with an accelerator operation amount having target acceleration/deceleration that is set to 0, it is possible to maintain constant vehicle speed even on a gradient road without needing an adjustment of the accelerator operation amount.

Here, in JP2000-205015A, in order to restrain changes in acceleration/deceleration and speed that change as a gradient of a road surface on which a vehicle travels changes, gradient correction is executed by which target acceleration/deceleration of the vehicle is corrected in accordance with the gradient of the road surface. Therefore, when an accelerator operation amount is increased on a descending gradient, gradient correction caused by the descending gradient corrects the target acceleration so that the target acceleration reduces. Hence, there is a case where the target acceleration is decreased even though an accelerator operation amount is increased. Also, when the accelerator operation amount is reduced on an ascending gradient, the target acceleration can be increased by gradient correction caused by the ascending gradient even though the accelerator operation amount is reduced. In such a situation, acceleration/deceleration of the vehicle changes depending on a road surface gradient regardless of an accelerator operation by the driver, and the driver may have a sense of discomfort.

SUMMARY

An object of the present invention is to provide a technology that reduces a gradient correction amount when a driver intends to accelerate on a descending gradient, and when a driver intends to decelerate on an ascending gradient, thereby restraining the driver from having a sense of discomfort.

According to one embodiment of the present invention, the electric vehicle control method according to the embodiment is a control method that includes the motor that gives braking force or driving force to a vehicle in accordance with an accelerator operation, by which the braking force is controlled when an accelerator operation amount is smaller than a given value and the driving force is controlled when the accelerator operation amount is the given value or larger. The electric vehicle control device estimates disturbance torque that acts on the motor as resistance component relating to a gradient and executes correction by which the braking force or the driving force is increased or decreased so as to cancel the resistance component based on a disturbance torque estimated value. Then, it is determined whether or not the accelerator operation amount is a partial-state equivalent, and either when the accelerator operation amount is larger than the partial-state equivalent on a downhill road, or when the accelerator operation amount is smaller than the partial-state equivalent on an uphill road, the correction amount is reduced.

The following describes the embodiments of the present invention in detail with accompanying drawings.

DETAILED DESCRIPTION OF THE EMBODIMENTS

Hereinafter, an example is described in which an electric vehicle control device according to the present invention is applied to an electric vehicle having an electric motor (hereinafter, also simply referred to as a motor) as a driving source.

Embodiment

Figure 1:
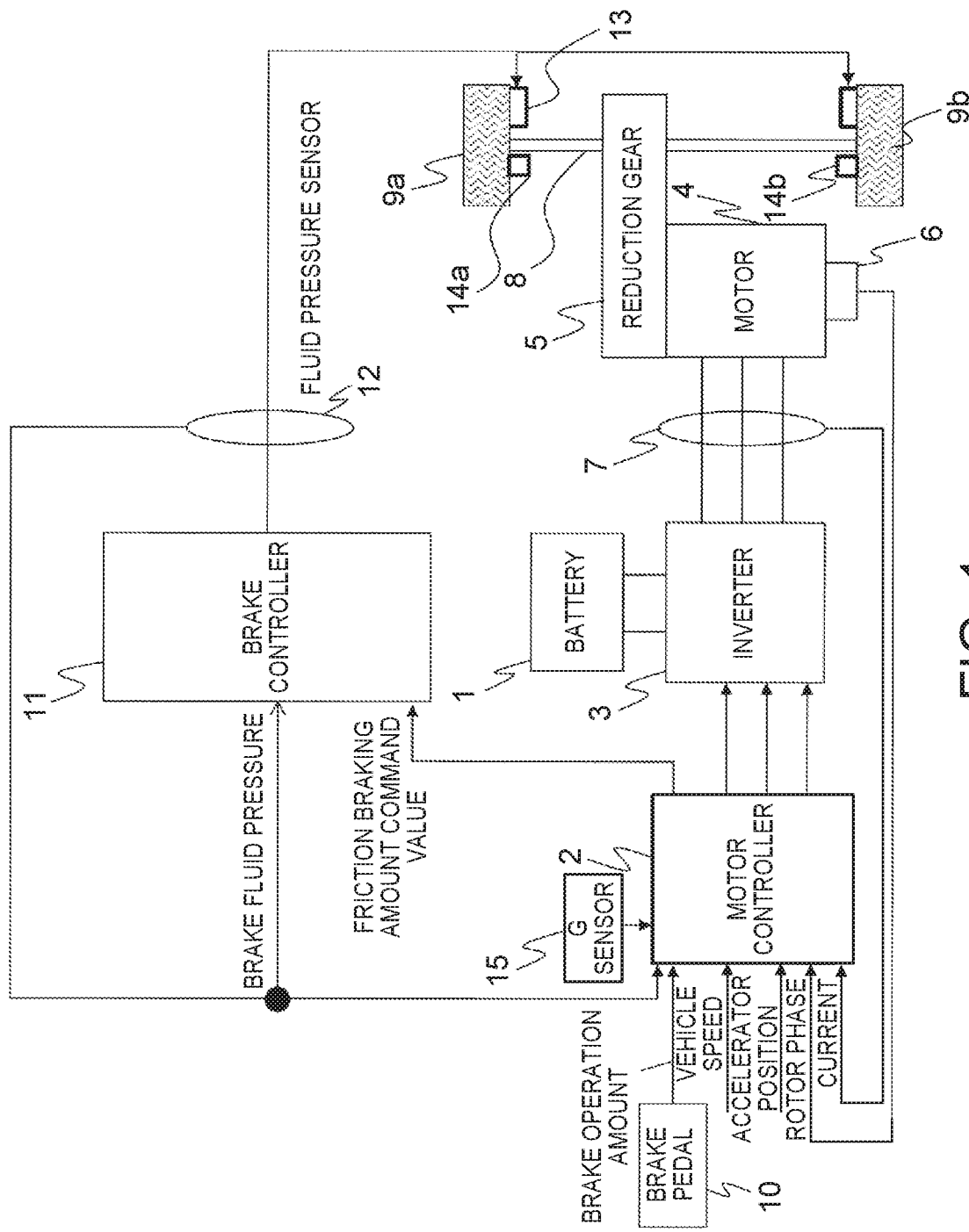
FIG. 1 is a block diagram of main components of an electric vehicle provided with an electric vehicle control device according to an embodiment.

FIG. 1 is a block diagram of main components of an electric vehicle that includes an electric vehicle control device according to an embodiment. The electric vehicle control device according to the present invention is provided with an electric motor as a part or all of a driving source of a vehicle, and is applicable to an electric vehicle that is able to travel with driving force of the electric motor. The electric vehicle is not only an electric car but may also be a hybrid car or a fuel-cell car. In particular, the electric vehicle control device according to the embodiment is applicable to a vehicle that is able to control acceleration, deceleration, and stoppage of the vehicle only with an operation of an accelerator pedal. In such a vehicle, a driver steps on the accelerator pedal to accelerate the vehicle, and the driver reduces a depression amount of the accelerator pedal that is stepped on, or brings the depression amount of the accelerator pedal to zero when the vehicle decelerates or stops. On an uphill road, a vehicle could approach a stopped state while stepping on the accelerator pedal in order to prevent the vehicle from moving backward.

Signals indicating vehicle statuses such as vehicle speed V, an accelerator position θ, a rotor phase α of a motor (a three-phase alternating current motor) 4, and three-phase alternating currents iu, iv, iw of the motor 4 are input to a motor controller 2 as digital signals. The motor controller 2 generates a PWM signal for controlling the motor 4 based on the input signals. Further, the motor controller 2 controls a switching element of an inverter 3 to open and close in accordance with the generated PWM signal. The motor controller 2 also generates a friction braking amount command value in accordance with an amount of an accelerator operation or an amount of an operation of a brake pedal 10 by a driver.

The motor controller 2 also functions as a controller that controls braking force generated in a vehicle when an amount of an accelerator operation (an accelerator position (an accelerator opening degree)) is smaller than a given value, and controls driving force generated in the vehicle when an accelerator operation amount is a given value or larger.

The inverter 3 turns on and off two switching elements (for example, power semiconductor elements such an IGBT and a MOS-FET) provided for each phase, and thus converts a direct current provided by a battery 1 into an alternating current so that a desired current flows in the motor 4.

The motor 4 generates driving force by using the alternating current supplied from the inverter 3, and transmits the driving force to left and right drive wheels 9a, 9b through a reduction gear 5 and a drive shaft 8. The motor 4 also generates regenerative driving force when the motor 4 is rotated together with the drive wheels 9a, 9b when the vehicle travels, and thus recovers kinetic energy of the vehicle as electric energy. In this case, the inverter 3 converts an alternating current generated during the regenerative operation of the motor 4 into a direct current, and supplies the direct current to the battery 1.

An electric current sensor 7 detects the three-phase alternating currents Iu, Iv, Iw flowing in the motor 4. However, since the sum of the three-phase alternating currents Iu, Iv, Iw is 0, currents in any two phases may be detected, and a current in the remaining one phase may be obtained by computation.

A rotation sensor 6 is, for example, a resolver or an encoder, and detects the rotor phase α of the motor 4.

A brake controller 11 outputs a brake actuator command value to a friction brake 13. With the brake actuator command value, brake fluid pressure is generated in accordance with the friction braking amount command value generated in the motor controller 2.

A fluid pressure sensor 12 functions as braking amount detection means, detects brake fluid pressure of the friction brake 13, and outputs the detected brake fluid pressure (a friction braking amount) to the brake controller 11 and the motor controller 2.

The friction brake 13 is provided in each of the left and right drive wheels 9a, 9b, and generates braking force in the vehicle by pressing a brake pad onto a brake rotor in accordance with the brake fluid pressure.

When maximum regenerative braking torque is insufficient for a driver's intended braking torque calculated from an accelerator operation amount, vehicle speed, and so on, the friction braking force generated by the friction brake 13 functions as braking force that is used in accordance with the friction braking amount command value output from the motor controller 2. Also, even when a driver's intended braking force is smaller than the maximum regenerative braking torque, the friction braking force is used when braking force desired by a driver cannot be covered only by regenerative braking torque because the regenerative electric power is limited when the battery 1 is fully charged, the motor 4 is protected from heat, and so on. Moreover, the friction braking force is not only requested in accordance with an accelerator operation amount but also used for achieving braking force desired by a driver's brake pedal operation amount.

A longitudinal G sensor 15 mainly detects longitudinal acceleration and outputs the detection value to the motor controller 2. Thus, the motor controller 2 is able to calculate a disturbance torque component that almost coincides with gradient resistance that acts on the motor 4 based on the value detected by the longitudinal G sensor.

Figure 2:
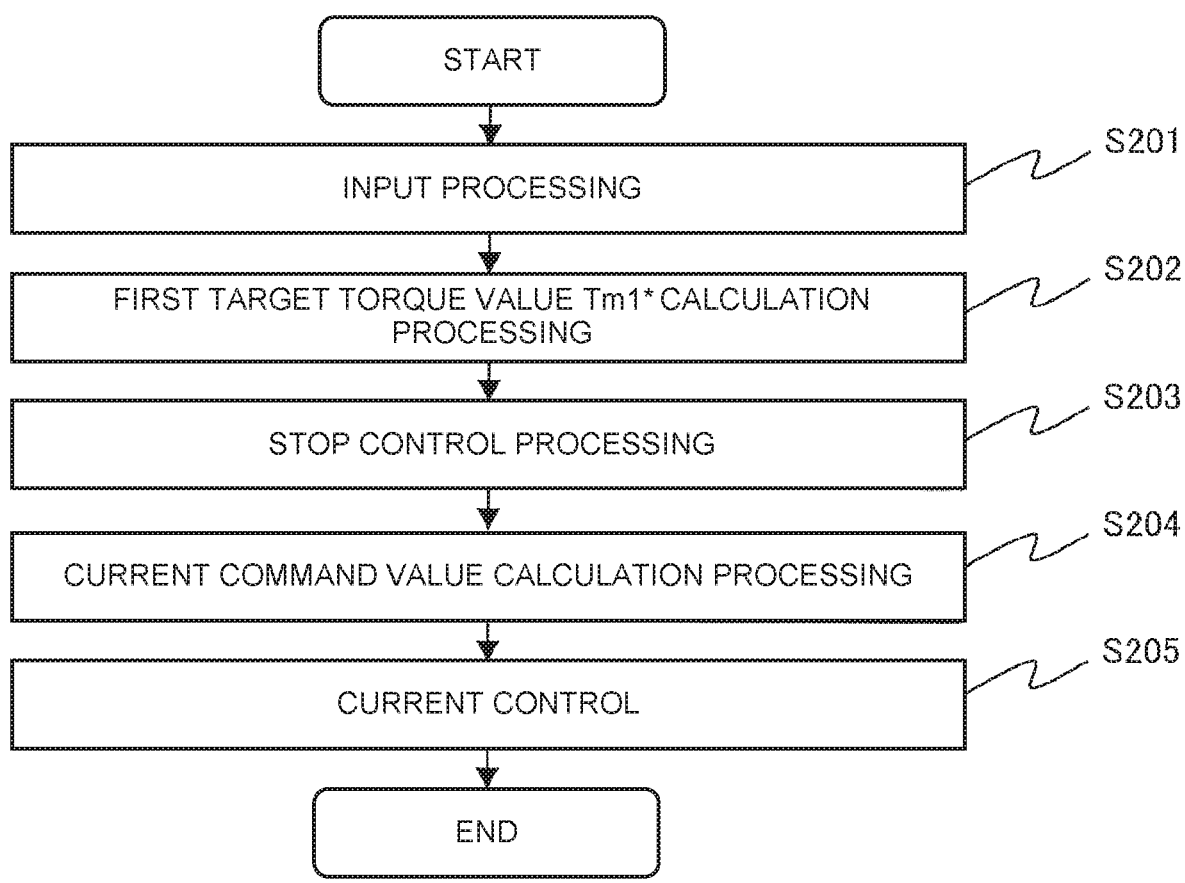
FIG. 2 is a flowchart showing a flow of processing of motor current control, the processing being executed by a motor controller provided in the electric vehicle control device according to the embodiment.

FIG. 2 is a flowchart showing a flow of motor current control processing that is programmed so as to be executed by the motor controller 2.

In step S201, signals indicating vehicle statuses are input to the motor controller 2. Here, vehicle speed V (m/s), an accelerator position θ (%), a rotor phase α (rad) of the motor 4, rotation speed Nm (rpm) of the motor 4, three-phase alternating currents iu, iv, iw flowing in the motor 4, a direct current voltage value $V_{dc}$ (V) between the battery 1 and the inverter 3, a brake operation amount, and brake fluid pressure are input.

The vehicle speed V (km/h) is wheel speed of the wheels (the drive wheels 9a, 9b) that transmit driving force when a vehicle is being driven. The vehicle speed V is acquired by wheel speed sensors 11a, 11b or through communication from another controller (not shown). Alternatively, the vehicle speed V (km/h) is obtained as follows. A rotor mechanical angular velocity ωm is multiplied by a tire dynamic radius r, and then divided by a gear ratio of final gear, and vehicle speed v (m/s) is thus obtained. Then, the vehicle speed v (m/s) is multiplied by 3600/1000 in order to convert the unit.

As an indicator of an accelerator operation amount by a driver, the accelerator position θ (%) is acquired by an accelerator position sensor (not shown) or through communication from another controller such as a vehicle controller (not shown).

The rotor phase α (rad) of the motor 4 is acquired from the rotation sensor 6. The rotation speed Nm (rpm) of the motor 4 is obtained as follows. Rotor angular velocity ω (an electric angle) is divided by the number of pole pairs p of the motor 4 so that motor rotation speed ωm (rad/s) that is mechanical angular velocity of the motor 4 is obtained. Then, the obtained motor rotation speed ωm is multiplied by 60/(2π), thereby the rotation speed Nm (rpm) is obtained. The rotor angular velocity ω is obtained by differentiating the rotor phase α.

The three-phase alternating currents iu, iv, iw (A) flowing in the motor 4 are acquired from the electric current sensor 7.

The direct current voltage value $V_{dc}$ (V) is obtained from a voltage sensor (not shown) provided in a direct current power source line between the battery 1 and the inverter 3, or from a power supply voltage value sent from a battery controller (not shown).

The braking amount is acquired from a brake fluid pressure sensor value detected by the fluid pressure sensor 12. A value detected by a stroke sensor (not shown) or the like that detects a stepping-on amount of a brake pedal by a driver's pedal operation (a brake operation amount) may be used instead as the braking amount.

In target torque value calculation processing in step S202, the motor controller 2 sets a first target torque value Tm1*. Specifically, first of all, with reference to an accelerator position-torque table shown in FIG. 3 that represents an aspect of a driving force characteristic that is calculated in accordance with the accelerator position θ and the motor rotation speed ωm input in step S201, a target basic torque value Tm0* (a target torque value) is set as torque requested by a driver. Next, a disturbance torque estimated value Td that almost coincides with gradient resistance is obtained. Then, the disturbance torque estimated value Td is added to the target basic torque value Tm0* as gradient assist torque, thereby setting the first target torque value Tm1* in which a gradient resistance component is canceled.

However, in the embodiment, the gradient resistance component is not canceled completely, and the gradient resistance component is canceled only by a given amount that is adjusted sensually in view of drive feeling. Further, in the embodiment, gradient correction amount adjustment processing is executed by which the given amount of the gradient resistance component to be canceled is reduced further in accordance with a driver's request for acceleration/deceleration and a gradient of a road surface on which the vehicle is running. Details of the gradient correction amount adjustment processing that is characteristic processing of the present invention are described later.

Figure 3:
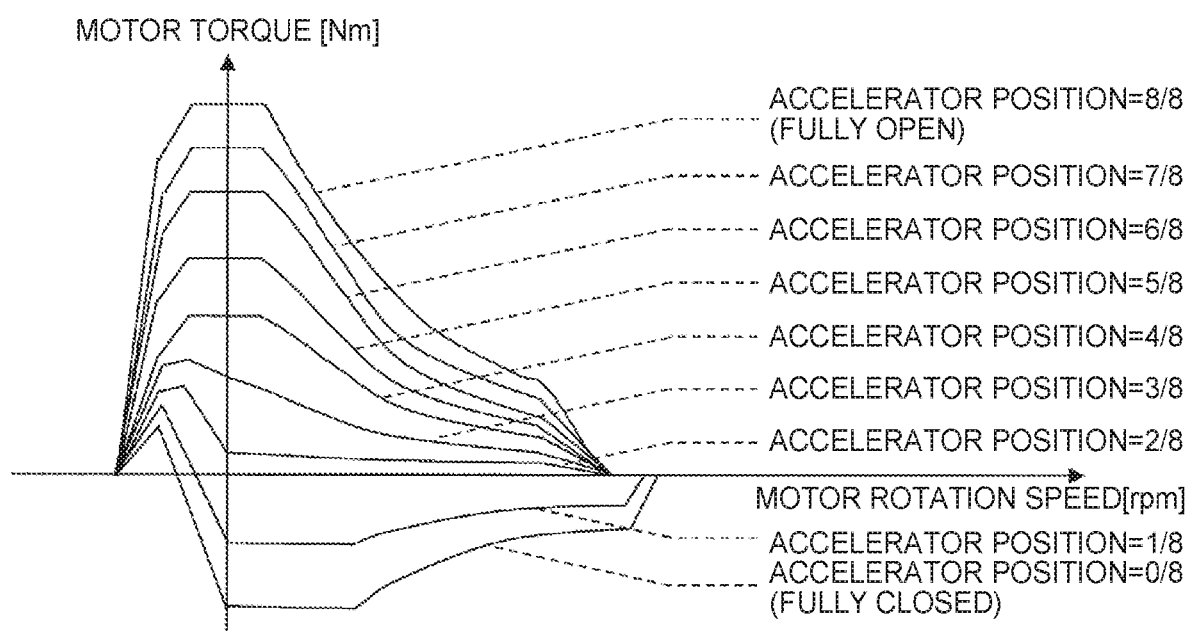
FIG. 3 is a view of an example of an accelerator position (an accelerator opening degree)-torque table.

As described above, the electric vehicle control device according to the embodiment is applicable to a vehicle that is able to control acceleration, deceleration, and stoppage of the vehicle only by operating the accelerator pedal, and it is possible to stop the vehicle by completely closing the accelerator pedal at least on a road surface with a given gradient or smaller. Therefore, in the accelerator position-torque table shown in FIG. 3, negative motor torque is set so that regenerative braking force works when the accelerator position is 0 (fully closed) through ⅛. However, the accelerator position-torque table shown in FIG. 3 is only an example and is not limited to this.

In step S203, the controller 2 executes stop control processing. Specifically, the controller 2 determines whether or not it is just before stop of a vehicle, and when it is not just before stop of the vehicle, the first target torque value Tm1* calculated in step S202 is set to a motor torque command value Tm*. When it is just before stop of the vehicle, a second target torque value Tm2* is set to the motor torque command value Tm*. The second target torque value Tm2* converges to the disturbance torque estimated value Td as the motor rotation speed reduces. The second target torque value Tm2* is positive torque on an uphill road, negative torque on a downhill road, and almost zero on a flat road.

Further, during the stop control processing in which the second target torque value Tm2* is set as the motor torque command value Tm*, reduction of the gradient correction amount described later (gradient correction amount reduction processing and the gradient correction amount adjustment processing) is not executed. This means that, during the stop control processing, since the motor torque command value Tm* converges to the disturbance torque estimated value Td that almost coincides with the gradient resistance, the vehicle stops smoothly and remains stopped only with an accelerator operation regardless of a gradient of a road surface.

In next step S204, the controller 2 executes current command value calculation processing. Specifically, a target d-axis current value id* and a target q-axis current value iq* are obtained based on the motor rotation speed ωm and the direct current voltage value Vdc in addition to the target torque value Tm* (the motor torque command value Tm*) calculated in step S203. For example, a table is prepared that defines relations among the torque command value, the motor rotation speed, and the direct current voltage value, and the target d-axis current value and the target q-axis current value, and the target d-axis current value id* and the target q-axis current value iq* are obtained with reference to the table.

In step S205, current control is executed so that a d-axis current id and a q-axis current iq coincide with the target d-axis current value id* and the target q-axis current value iq* obtained in step S204, respectively. In order to do so, first of all, the d-axis current id and the q-axis current iq are obtained based on the three-phase alternating currents iu, iv, iw and the rotor phase α of the motor 4 that are input in step S201. Next, from respective deviations between the d-axis and q-axis current command values id*, iq* and the d-axis and q-axis currents id, iq, d-axis and q-axis voltage command values vd, vq are calculated. A non-interference voltage that is necessary to cancel interference voltage between d-q orthogonal coordinates may be added to the calculated d-axis and q-axis voltage command values vd, vq.

Then, three-phase alternating current voltage command values vu, vv, vw are obtained from the d-axis and q-axis voltage command values vd, vq, and the rotor phase α of the motor 4. PWM signals tu (%), tv (%), tw (%) are obtained from the obtained three-phase alternating current voltage command values vu, vv, vw and the direct current voltage value Vdc. As the switching element of the inverter 3 is opened and closed by the PWM signals tu, tv, tw obtained as described above, it is possible to drive the motor 4 with desired torque instructed by the motor torque command value Tm*.

The processing executed in step S202 in FIG. 2, in other words, a method for setting the first target torque value Tm1* is described in detail with reference to FIG. 4.

A target basic torque value setter 401 refers to the accelerator position-torque table shown in FIG. 3 and sets the target basic torque value Tm0* based on an accelerator position and motor rotation speed ωm.

A disturbance torque estimator 402 obtains the disturbance torque estimated value Td based on the motor torque command value Tm*, the motor rotation speed ωm, and a braking amount B.

Figure 5:
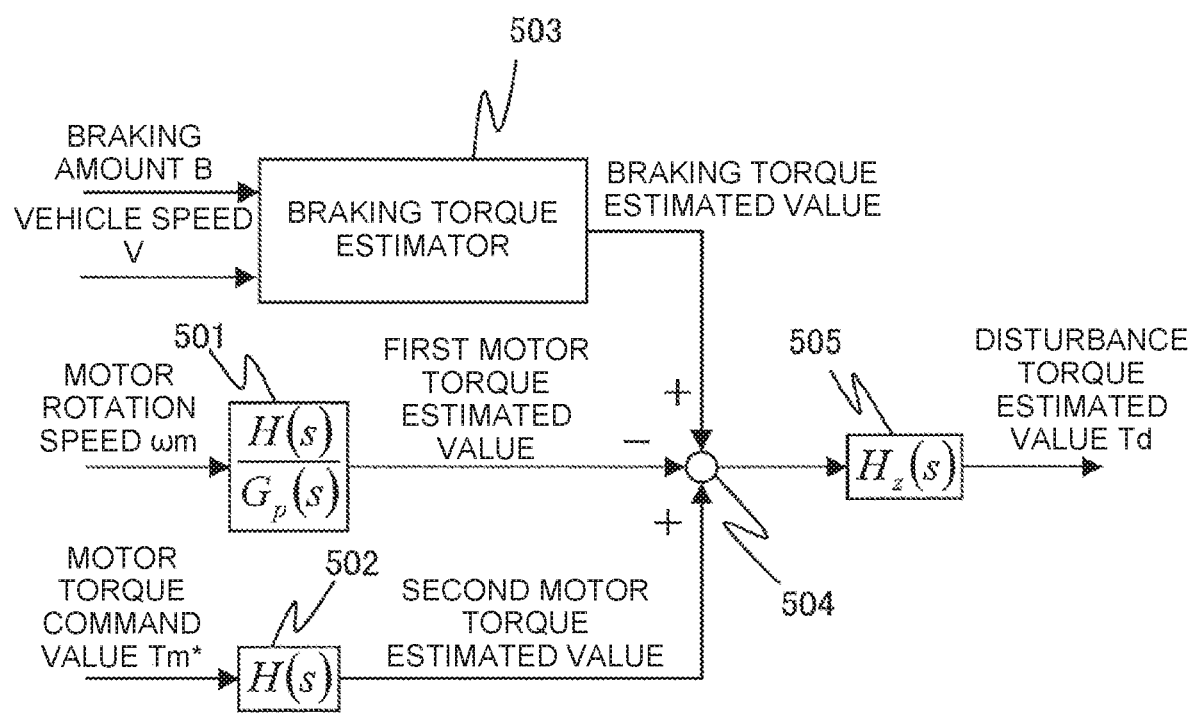
FIG. 5 is a view describing a method for calculating a disturbance torque estimated value.

FIG. 5 is a detailed block diagram of the disturbance torque estimator 402. The disturbance torque estimator 402 includes a control block 501, a control block 502, a braking torque estimator 503, an adder/subtracter 504, and a control block 505.

The control block 501 serves a function as a filter having a transfer characteristic of H(s)/Gp(s), and executes filtering processing of the motor rotation speed ωm that is input to the control block 501, thereby calculating a first motor torque estimated value. Gp(s) is a transfer characteristic from motor torque Tm through the motor rotation speed ωm, and details of Gp(s) are given later. H(s) is a low pass filter having a transfer characteristic in which a difference between a degree of a denominator and a degree of a numerator of H(s) becomes a difference between a degree of a denominator and a degree of a numerator of the transfer characteristic Gp(s) or larger.

The control block 502 serves a function as a low pass filter having a transfer characteristic of H(s), and executes filtering processing of the motor torque command value Tm* that is input to the control block 502, thereby calculating a second motor torque estimated value.

The braking torque estimator 503 calculates a braking torque estimated value based on the braking amount B and the vehicle speed V. In the braking torque estimator 503, the braking torque estimated value is calculated in consideration of multiplication processing for performing conversion from the braking amount B into motor shaft torque, responsiveness from a fluid pressure sensor value detected by the fluid pressure sensor 12 until actual braking force, and so on.

Since the braking force by the friction brake 13 acts in a deceleration direction when a vehicle moves both forward and backward, it is necessary to invert a sign of the braking torque estimated value in accordance with a sign of vehicle longitudinal speed (vehicle body speed, wheel speed, motor rotation speed, drive shaft rotation speed, or other speed parameter proportional to vehicle speed). Therefore, in accordance with the vehicle speed V that is input, the braking torque estimator 503 sets a sign of the braking torque estimated value to a negative sign when the vehicle moves forward, and to a positive sign when the vehicle moves backward.

The adder/subtracter 504 subtracts the first motor torque estimated value from the second motor torque estimated value, and also adds a braking torque correction value. In the adder/subtracter 504, since the braking torque correction value having a negative sign with respect to an advancing direction of the vehicle is added, it is possible to calculate at a later stage the disturbance torque estimated value Td in which braking torque caused by the braking amount B is canceled. The calculated value is output to the control block 505.

The control block 505 is a filter having a transfer characteristic of Hz(s), and executes filtering processing of an output of the adder/subtracter 504, thereby calculating the disturbance torque estimated value Td. Then, the control block 505 outputs the disturbance torque estimated value Td to the gradient correction amount adjuster 403 shown in FIG. 4. Details of Hz(s) are described later.

Referring back to FIG. 4, the description continues. Conventionally, the disturbance torque estimated value Td calculated in the disturbance torque estimator 402 is input to an adder 405 and added to the target basic torque value Tm0*. Thus, gradient correction of the target basic torque value Tm0* is executed based on the disturbance torque estimated value Td, and a gradient assist torque corresponding to a gradient resistance component is added. Thus, the first target torque value Tm1* in which the gradient resistance component is canceled is calculated. Therefore, even when, for example, a vehicle travels on a road surface with various gradients at a constant accelerator position, it is possible to maintain uniform speed without any influence of the gradient resistance component.

However, when there is absolutely no influence of the gradient resistance component on acceleration and deceleration due to such gradient correction, a driver traveling on a gradient road may have a sense of discomfort.

For example, in a situation where a first vehicle is traveling on a gradient road with two or more lanes on one side and a second vehicle in which no gradient correction is executed is traveling next to the first vehicle, a driver of the first vehicle is given a sense of discomfort about control when his/her vehicle is traveling at constant speed while the second vehicle traveling next to him/her is accelerating and decelerating in accordance with the road gradient.

Also, when the driver intends to accelerate on a descending gradient, acceleration (driving force) generated based on an accelerator operation by the driver is corrected to be reduced in accordance with the gradient. Meanwhile, when a driver intends to decelerate on an ascending gradient, deceleration (braking force) generated based on an accelerator operation by the driver is corrected to increase in accordance with the gradient. In these situations, acceleration/deceleration (driving/braking force) based on an accelerator operation of the driver is changed to a direction opposite to the driver's acceleration/deceleration request in accordance with a road gradient. This means that, when the gradient correction that cancels the entire gradient resistance is performed, then an acceleration/deceleration expected value with regard to the driver's accelerator operation amount differs from actual acceleration/deceleration generated in the vehicle. This gives the driver a sense of discomfort of control.

In the embodiment, in order to restrain the foregoing sense of discomfort given to the driver, the gradient correction amount reduction processing is executed. In this processing, the gradient resistance component is not completely canceled, and the gradient resistance component is canceled only by a given amount that is sensually adjusted in view of drive feeling. Further, in the embodiment, the gradient correction amount adjustment processing is executed in which the gradient resistance component to be canceled by the given amount is further reduced in accordance with a road surface gradient and a driver's acceleration/deceleration request. Hereinafter, components for executing the gradient correction amount reduction processing and the gradient correction amount adjustment processing are described.

Figure 4:
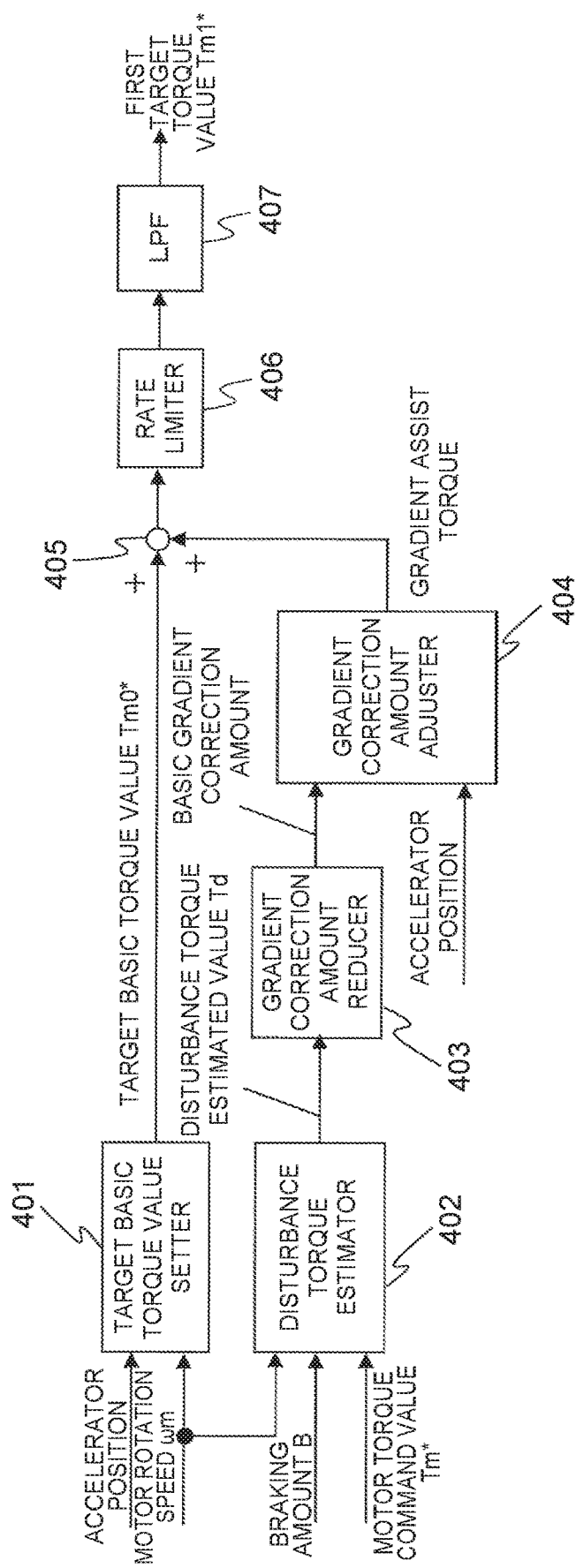
FIG. 4 is a view describing a method for calculating a first target torque value according to the embodiment.

A gradient correction amount reducer 403 shown in FIG. 4 is a component for executing the gradient correction amount reduction processing. In the gradient correction amount adjuster 403, the disturbance torque estimated value Td estimated in the disturbance torque estimator 402 is input, and a given amount of a gradient resistance component is reduced from the disturbance torque estimated value Td that almost coincides with gradient resistance. Thus, the basic gradient correction amount is calculated. The basic gradient correction amount calculated here is described with reference to FIG. 6.

Figure 6:
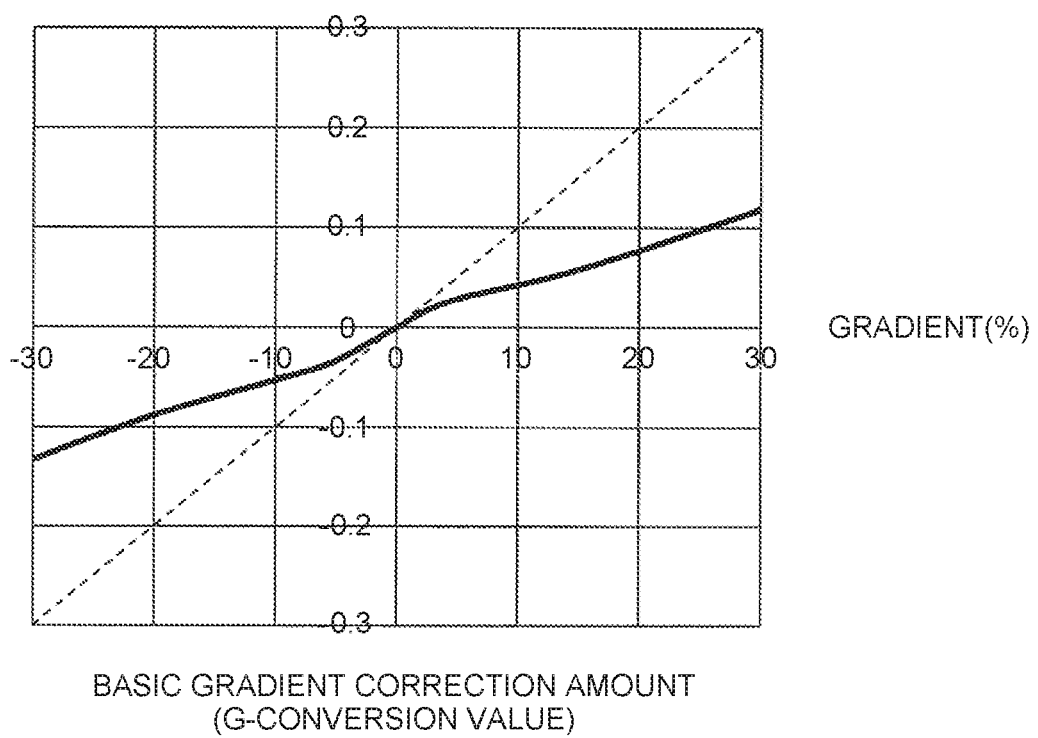
FIG. 6 is a view describing how to calculate a basic gradient correction amount.

FIG. 6 is a view describing the basic gradient correction amount according to the embodiment. A horizontal axis represents a gradient (%), and a vertical axis represents a G-conversion value of the basic gradient correction amount. The gradient (%) in a positive value represents an uphill road, and the gradient (%) in a negative value represents a downhill road. Also, the larger an absolute value of the gradient (%) is, the steeper the gradient is. A broken line shown in the drawing represents a gradient correction amount that almost coincides with gradient resistance of a road surface, and indicates the disturbance torque estimated value Td before the gradient correction amount reduction processing is executed. Also, a solid line shows the basic gradient correction amount according to the embodiment.

As shown in the drawing, in the embodiment, the reduction rate of the gradient correction amount in the gradient correction amount reducer 403 is set to about 50%, and a basic gradient assist amount before the gradient correction amount adjustment processing is executed at a later stage is about a half of the gradient resistance component. Thus, the gradient resistance component amount to be canceled is halved. Therefore, the driver is able to feel that the vehicle is traveling on a gradient road, while an accelerator operation amount by the driver on the gradient road is reduced further compared to a case where the gradient correction is not performed. As a result, especially when a vehicle is traveling at constant speed on a gradient road, it is possible to restrain a sense of discomfort generated as the gradient correction is performed.

The basic gradient correction amount calculated in the gradient correction amount reducer 403 is input to the gradient correction amount adjuster 404 shown in FIG. 4. However, 50% described as the reduction rate of the gradient correction amount is only an example, and the reduction rate may be, for example, about 40%. The reduction rate of the gradient correction amount is set as appropriate in view of drive feeling based on a result of a sensory test and so on.

The gradient correction amount adjuster 404 is a component for realizing the gradient correction amount adjustment processing. In the gradient correction amount adjuster 404, the basic gradient correction amount calculated in the gradient correction amount reducer 403, and an accelerator position are input, and gradient assist torque after the gradient correction amount adjustment processing is executed is calculated. To be more specific, the gradient correction amount adjuster 404 calculates gradient assist torque that is obtained by further reducing the basic gradient correction amount in accordance with a driver's acceleration/deceleration request in order to restrain a sense of discomfort given to the driver when there is an acceleration/deceleration request on an uphill road or on a downhill road. Thus, gradient assist torque is calculated that restrains a driver from having a sense of discomfort that is generated when an acceleration/deceleration expected value with respect to an accelerator operation amount by the driver himself/herself is different from actual acceleration/deceleration happening to the vehicle on a gradient road. Details regarding how to calculate the gradient assist torque are described later.

In the adder 405, the first target torque value Tm1* before limiter processing is calculated by adding the target basic torque value Tm0* serving as the driver request torque calculated in the target basic torque value setter 401 to the gradient assist torque calculated in the gradient correction amount adjuster 404. The first target torque value Tm1* before the limiter processing is input to a rate limiter 406.

The rate limiter 406 limits an upper limit of a rate of change of the first target torque value Tm1*. Thus, it is possible to prevent a steep change of the target torque value. The upper limit of the rate of change may be changed in accordance with vehicle speed. Further, an output of the rate limiter 406 is input to a low pass filter 407 in order to remove high-frequency noise and so on.

The low pass filter 407 is a low pass filter configured so as to remove a high-frequency noise component, and calculates the first target torque value Tm1* as a braking/driving torque command value by executing filtering processing for the output of the rate limiter 406.

With the first target torque value Tm1* calculated as above, it is possible to reduce a driver's accelerator operation amount (a stroke amount) without generating a sense of discomfort especially when a vehicle is traveling at constant speed on a gradient road. Further, with the first target torque value Tm1*, when there is a driver's acceleration/deceleration request on a gradient road, it is possible to restrain the sense of discomfort from being generated when an acceleration/deceleration expected value with respect to an accelerator operation amount by the driver is different from actual acceleration/deceleration happening to the vehicle.

Before description of the deceleration control processing, the transfer characteristic Gp(s) from the motor torque Tm to the motor rotation speed ωm in the electric vehicle control device according to the embodiment is described here. The transfer characteristic Gp(s) is used as a vehicle model in which a driving force transfer system of a vehicle is modeled, when a disturbance torque estimated value is calculated.

Figure 7:
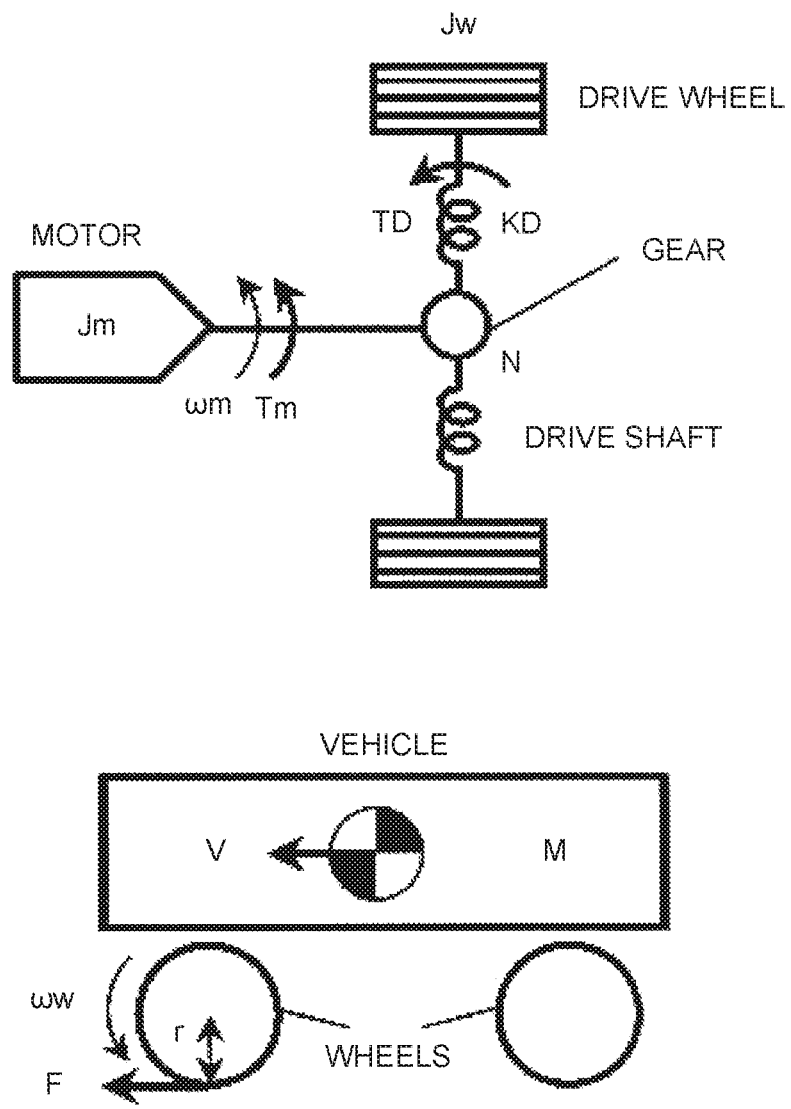
FIG. 7 is a view of modeling of a driving force transfer system in a vehicle.

FIG. 7 is a view of modeling of a driving force transfer system in a vehicle, and parameters in the drawing are as follows.

$J_m$: Inertia of the electric motor
$J_w$: Inertia of the drive wheel
M: Vehicle weight
$K_d$: Torsion rigidity of a drive system
$K_t$: Coefficient with respect to friction between a tire and a road surface
N: Overall gear ratio
r: Load radius of the tire
$\omega_m$: Motor rotation speed
$T_m$: Target torque value Tm*
$T_d$: Torque of a drive wheel
F: Force applied to a vehicle
V: Vehicle speed
$\omega_w$: Angular velocity of the drive wheel Then, the following motion equations are derived from FIG. 7.

[Equation 1]

$$J_m \cdot \omega_m^* = T_m - T_d/N \tag{1}$$

[Equation 2]

$$2J_w \cdot \omega_w^* = T_d - rF \tag{2}$$

[Equation 3]

$$M \cdot V^* = F \tag{3}$$

[Equation 4]

$$T_d = K_d \cdot \int (\omega_m/N - \omega_w) dt \tag{4}$$

[Equation 5]

$$F = K_t \cdot (r\omega_w - V) \tag{5}$$

The asterisk (*) stated on the upper right of each sign in Equation 1-Equation 3 expresses a time deferential.

When the transfer characteristic Gp(s) from the motor torque Tm to the motor rotation speed ωm of the motor 4 is obtained based on the motion equations stated in Equation 1-Equation 5, the transfer characteristic Gp(s) is expressed by next Equation 6.

[Equation 6]

$$G_p(s) = \frac{b_3 s^3 + b_2 s^2 + b_1 s + b_0}{s(a_4 s^3 + a_3 s^2 + a_2 s + a_1)} \quad (6)$$

The parameters in Equation 6 are expressed in Equations 7 below.

[Equations 7]

$a_4 = 2J_m J_w M$ $a_3 = J_m(2J_w + Mr^2)K_t$ $a_2 = (J_m + 2J_w/N^2)M \cdot K_d$ $a_1 = (J_m + 2J_w/N^2 + Mr^2/N^2)K_d \cdot K_t$ $b_3 = 2J_w \cdot M$ $b_2 = (2J_w + Mr^2)K_t$ $b_1 = M \cdot K_d$ $b_0 = K_d \cdot K_t$ \hfill (7)

By examining poles and zeros of the transfer function shown in Equation 6, Equation 6 is able to approximate a transfer function stated in next Equation 8, and one pole and one zero show values that are extremely close to each other. This is equivalent to that α and β in next Equation 8 are values that are extremely close to each other.

[Equation 8]

$$G_p(s) = \frac{(s + \beta)(b_2' s^2 + b_1' s + b_0')}{s(s + \alpha)(a_3' s^2 + a_2' s + a_1')} \quad (8)$$

Therefore, as pole-zero cancellation in Equation 8 (approximation to α=β) is executed, Gp(s) constitutes a transfer characteristic of (secondary)/(third order) as shown in next Equation 9.

[Equation 9]

$$G_p(s) = \frac{(b_2' s^2 + b_1' s + b_0')}{s(a_3' s^2 + a_2' s + a_1')} \cdot \frac{\beta}{\alpha} \quad (9)$$

Figure 8:
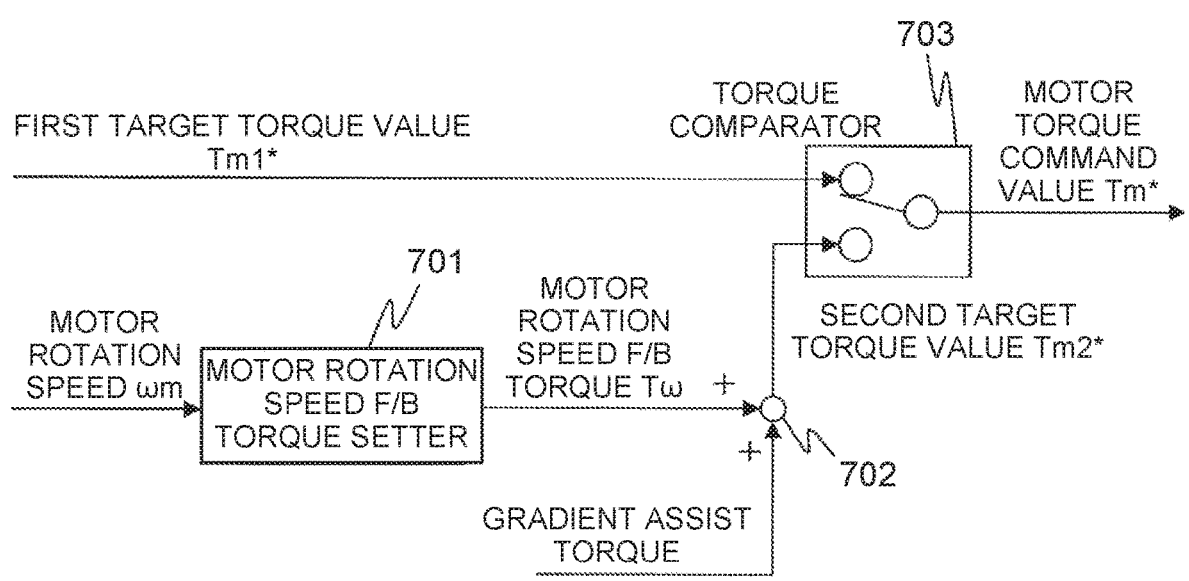
FIG. 8 is a block diagram realizing stop control processing.
Figure 9:
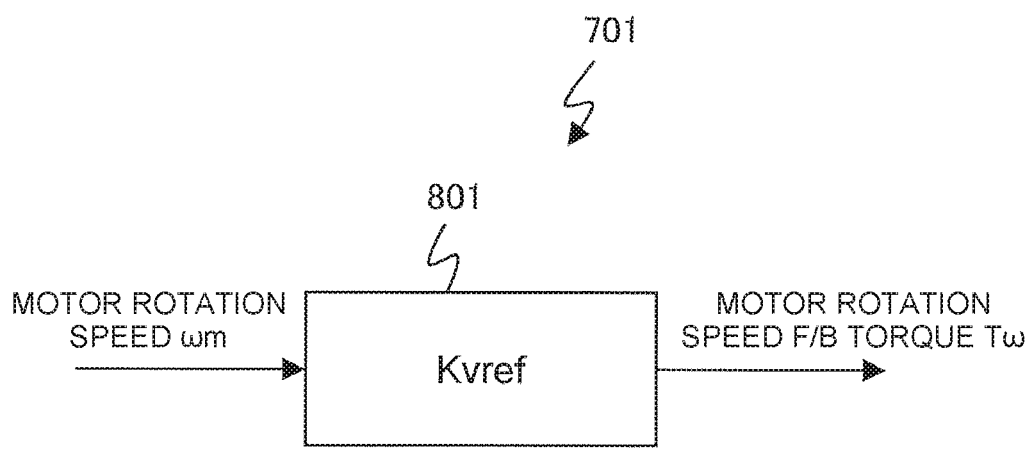
FIG. 9 is a view describing a method for calculating a motor rotation speed F/B torque Tw based on motor rotation speed.

Next, with reference to FIG. 8 and FIG. 9, details of the stop control processing executed in step S203 are described.

FIG. 8 is a block diagram for realizing the stop control processing. The stop control processing is executed by using a motor rotation speed F/B torque setter 701, an adder 702, and a torque comparator 703. Hereinafter, details of each of the components are described.

The motor rotation speed F/B torque setter 701 calculates motor rotation speed feedback torque (hereinafter, referred to as motor rotation speed F/B torque) Tω based on the detected motor rotation speed ωm. The details are given with reference to FIG. 9.

FIG. 9 is a view for describing a method for calculating the motor rotation speed F/B torque Tω based on the motor rotation speed ωm. The motor rotation speed F/B torque setter 701 includes a multiplier 801, and multiplies the motor rotation speed ωm by a gain Kvref, thereby calculating the motor rotation speed F/B torque Tω. The Kvref is a negative (minus) value that is necessary to stop an electric vehicle just before stop of the electric vehicle, and is set as appropriate based on experimental data and so on. The motor rotation speed F/B torque Tω is set as torque that realizes larger braking force as the motor rotation speed ωm becomes higher.

Although the motor rotation speed F/B torque setter 701 is described that it calculates the motor rotation speed F/B torque Tω by multiplying the motor rotation speed ωm by the gain Kvref, the motor rotation speed F/B torque setter 701 may calculate the motor rotation speed F/B torque Tω by using, for example, a regenerative torque table in which regenerative torque is defined with respect to the motor rotation speed ωm, or an attenuation rate table in which an attenuation rate of motor rotation speed ωm is stored in advance.

The description continues referring back to FIG. 8. The adder 702 adds the motor rotation speed F/B torque Tω calculated in the motor rotation speed F/B torque setter 701 to the gradient assist torque calculated in the foregoing gradient correction amount adjuster 403 by multiplying the disturbance torque estimated value Td by a reduction rate of gradient correction amount. Thus, the second target torque value Tm2* is calculated.

Here, with regard to the disturbance torque estimated value Td, details of the control block 505 shown in FIG. 5 are given. The control block 505 is a filter having the transfer characteristic of Hz(s), and executes filtering processing of an output of the adder/subtracter 504 that is input to the control block 505, thereby calculating the disturbance torque estimated value Td.

The transfer characteristic Hz(s) is described. By rewriting Equation 9, next Equation 10 is obtained. However, $\zeta_z$, $\omega_z$, $\zeta_p$, $\omega_p$ in Equation 10 are expressed by Equations 11.

[Equation 10]

$$G_p(s) = \frac{Mp(s^2 + 2\zeta_z \cdot \omega_z \cdot s + \omega_z^2)}{s(s^2 + 2\zeta_p \cdot \omega_p \cdot s + \omega_p^2)} \quad (10)$$

[Equations 11]

$$\zeta_z = \frac{b_1'}{2(b_0' \cdot b_2')^{1/2}} \quad (11)$$

$$\omega_z = \left(\frac{b_0'}{b_2'}\right)^{1/2}$$

$$\zeta_p = \frac{a_2'}{2(a_1' \cdot a_3')^{1/2}}$$

$$\omega_p = \left(\frac{a_1'}{a_3'}\right)^{1/2}$$

According to the foregoing, Hz(s) is expressed by next Equation (12) provided that $\zeta_c > \zeta_z$. For example, $\zeta_c > 1$ in order to enhance a vibration suppressing effect in a deceleration scene accompanied by gear backlash.

[Equation 12]

$$H_z(s) = \frac{(s^2 + 2\zeta_z \cdot \omega_z \cdot s + \omega_z^2)}{(s^2 + 2\zeta_c \cdot \omega_z \cdot s + \omega_z^2)} \quad (12)$$

As described above, the disturbance torque estimated value Td according to the embodiment is estimated by a disturbance observer as shown in FIG. 5. However, the disturbance torque estimated value Td may be corrected for higher precision based on a detection value of the longitudinal G sensor 15. Also, a torque conversion value of a gradient resistance component calculated based on a detection value of the longitudinal G sensor 15 may be used as the disturbance torque estimated value Td.

Although air resistance, a modeling error caused by variation of a vehicle mass due to the number of occupants and a load weight, rolling resistance of a tire, gradient resistance of a road surface, and so on are considered as the disturbance, gradient resistance is a dominant disturbance factor especially just before stop of a vehicle. Although the disturbance factors change depending on driving conditions, the foregoing disturbance factors are estimated collectively since the disturbance torque estimator 402 calculates the disturbance torque estimated value Td based on the motor torque command value Tm*, the motor rotation speed ωm, and the transfer characteristic Gp(s). Thus, a vehicle is able to stop smoothly followed by deceleration under any driving condition.

Referring back to FIG. 8, the description continues. The adder 702 calculates the second target torque value Tm2* by adding the motor rotation speed F/B torque Tω calculated by the motor rotation speed F/B torque setter 701 to the gradient correction torque.

The torque comparator 703 compares the magnitudes of the first target torque value Tm1* and the second target torque value Tm2*, and sets the larger target torque value as the motor torque command value Tm*. While a vehicle is traveling, the second target torque value Tm2* is smaller than the first target torque value Tm1*. When the vehicle decelerates and just before stop of the vehicle (at given vehicle speed or slower, or when a speed parameter proportional to vehicle speed becomes a given value or smaller), the second target torque value Tm2* is larger than the first target torque value Tm1*. Therefore, when the first target torque value Tm1* is larger than the second target torque value Tm2*, the torque comparator 703 determines that it is not just before stop of the vehicle yet and sets the motor torque command value Tm* to the first target torque value Tm1*.

Further, when the second target torque value Tm2* becomes larger than the first target torque value Tm1*, the torque comparator 703 determines that it is just before stop of the vehicle, and switches the motor torque command value Tm* from the first target torque value Tm1* to the second target torque value Tm2*. At that moment, the gradient assist torque is set to a value that coincides with the disturbance torque estimated value Td. Therefore, while the second target torque value Tm2* is set to the motor torque command value Tm*, the gradient correction amount reduction processing and the gradient correction amount adjustment processing described later are not executed, and the disturbance torque estimated value Td is set as the gradient assist torque as it is. In order to maintain a stopping state of the vehicle, the second target torque value Tm2* is a positive torque on an uphill road and a negative torque on a downhill road, and converges to almost zero on a flat road.

The details of the transfer characteristic $G_p(s)$ and the stop control processing have been described so far. Next, detailed description is given regarding how to calculate the gradient assist torque by using the gradient correction amount reducer 403 and the gradient correction amount adjuster 404 shown in FIG. 4.

Figure 10:
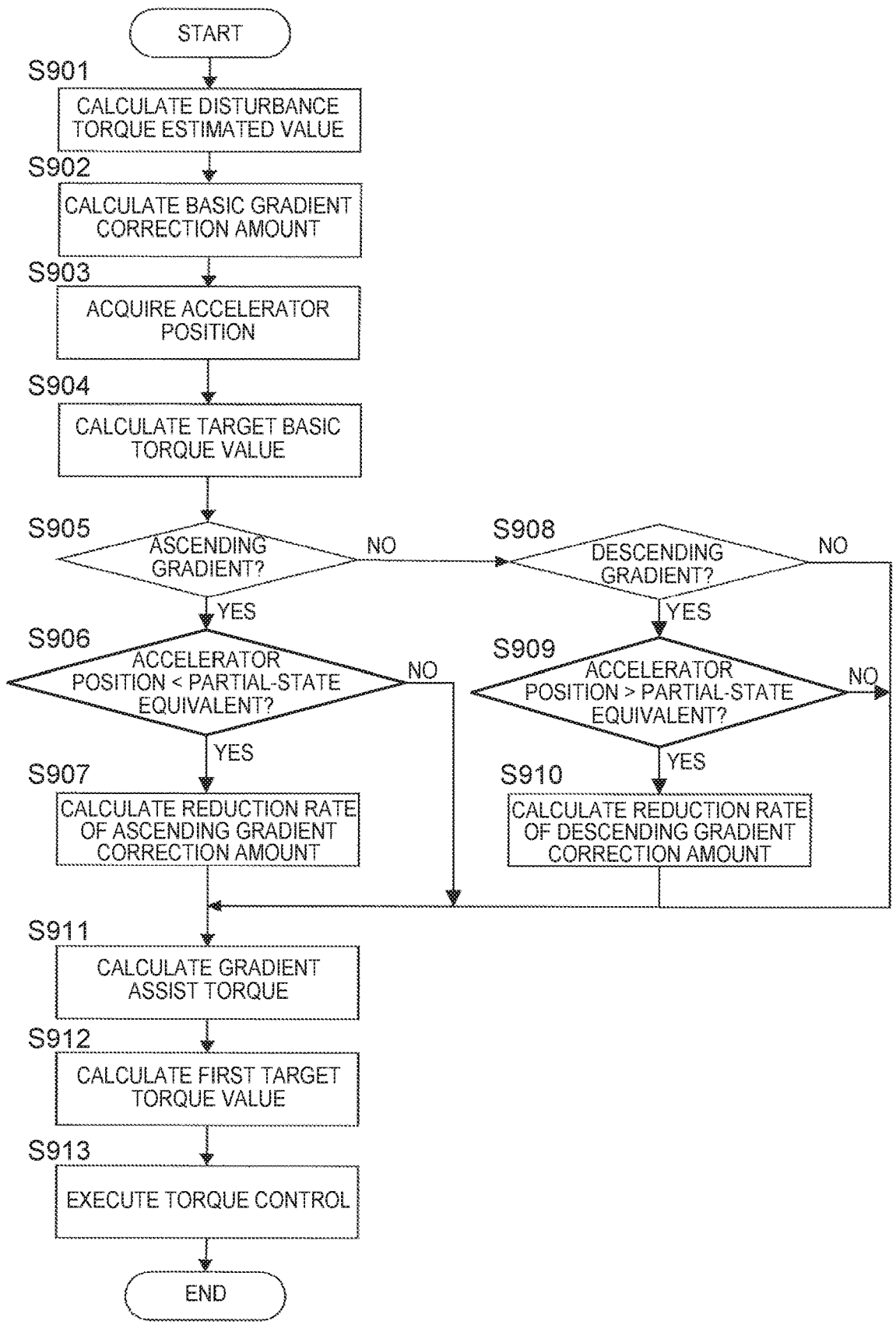
FIG. 10 is a flowchart showing a flow of calculation of gradient assist torque.

FIG. 10 is a flowchart describing a flow of control until the gradient assist torque is calculated from the disturbance torque estimated value Td according to the embodiment. The control is programmed so that it is repeatedly executed by the motor controller 2 in a fixed cycle.

In step S901, the motor controller 2 calculates the disturbance torque estimated value Td. The disturbance torque estimated value Td is calculated by using the disturbance observer described with reference to FIG. 5.

Next, in step S902, the motor controller 2 calculates a basic gradient correction amount. Specifically, the motor controller 2 calculates the basic gradient correction amount by multiplying the disturbance torque estimated value Td by the reduction rate of the gradient correction amount. As described with reference to FIG. 6, in the embodiment, since the reduction rate of the gradient correction amount is set to about 50%, the basic gradient correction amount equivalent to about a half of the disturbance torque estimated value Td, in other words, about a half of the gradient resistance component is calculated. After the basic gradient correction amount is calculated, processing of next step S903 is executed.

In the next step S903, an accelerator position is acquired in order to detect a driver's acceleration/deceleration request. As described with reference to FIG. 3, a given accelerator position or larger serves as an acceleration request, and positive motor torque (driving torque) is set. Meanwhile, an accelerator position smaller than the given accelerator position serves as a deceleration request, and negative motor torque (braking torque) is set so that regenerative braking force is applied.

Here, a traveling state of a vehicle without a driver's acceleration/deceleration request is defined as a partial state. In other words, the partial state is defined as a state where a vehicle is traveling while maintaining constant speed, and no acceleration/deceleration is generated in the vehicle. However, the constant speed does not necessarily mean completely uniform speed, and includes a state where a velocity amplitude is maintained to an extent that can be considered that the vehicle is not accelerating/decelerating.

Based on above, in the embodiment, a driver's acceleration/deceleration request is detected by comparing the acquired accelerator position and an accelerator position at which the vehicle is brought into the partial state (a partial-state equivalent). To be more specific, when the accelerator position is smaller than the partial-state equivalent, it is determined that the driver is requesting deceleration. On the contrary, when the accelerator position is larger than the partial-state equivalent, it is determined that the driver is requesting acceleration. When the accelerator position is the partial-state equivalent, it is determined that the driver is not requesting acceleration/deceleration. However, since the accelerator position of the partial-state equivalent changes in accordance with values set in the accelerator position-torque table shown in FIG. 3, when the set values of the accelerator position-torque table are changed, the accelerator position of the partial-state equivalent also changes accordingly. The description continues based on above.

In step S904, the motor controller 2 refers to the accelerator position-torque table shown in FIG. 3 as an example and calculates the target basic torque value Tm0* as driver request torque based on the accelerator position θ and the motor rotation speed ωm. Once the target basic torque value Tm0* is calculated, processing of next step S905 is executed in order to determine whether or not a road surface where the vehicle is traveling is an uphill road.

In step S905, the motor controller 2 determines whether or not the road surface is an uphill road (an ascending gradient). Here, in order to determine whether or not the road surface is an uphill road, it is determined whether or not the basic gradient correction amount is larger than 0. The basic gradient correction amount is a value obtained by reducing the disturbance torque estimated value Td by half. As described above, a gradient of a road surface is acquired from the disturbance torque estimated value Td. Also, the disturbance torque estimated value Td is positive torque on an uphill road, negative torque on a downhill road, and almost zero on a flat road. Therefore, in this step, when the basic gradient correction amount is larger than 0, it is determined that the road surface is an uphill road, and processing of next step S906 is executed. When the basic gradient correction amount is 0 or lower, it is determined that the road surface is not an uphill road. Therefore, processing of step S908 is executed in order to determine whether or not the road surface is a downhill road.

In step S906, the motor controller 2 determines whether or not the accelerator position is smaller than the partial-state equivalent in order to detect a driver's deceleration request. When the accelerator position is smaller than the partial-state equivalent, it is determined that the driver is requesting deceleration as described above. Therefore, processing of next step S907 is executed in order to calculate the reduction rate of the correction amount when deceleration is requested on an uphill road (an ascending gradient). When the accelerator position is not smaller than the partial-state equivalent, processing of step S911 is executed so that the basic gradient correction amount is set as gradient assist torque.

In step 907, the motor controller 2 calculates the reduction rate of the correction amount when deceleration is requested on an uphill road (the reduction rate of an ascending gradient correction amount) in order to execute the gradient correction amount adjustment processing. Calculation of the reduction rate of the ascending gradient correction amount is described with reference to FIG. 11.

Figure 11:
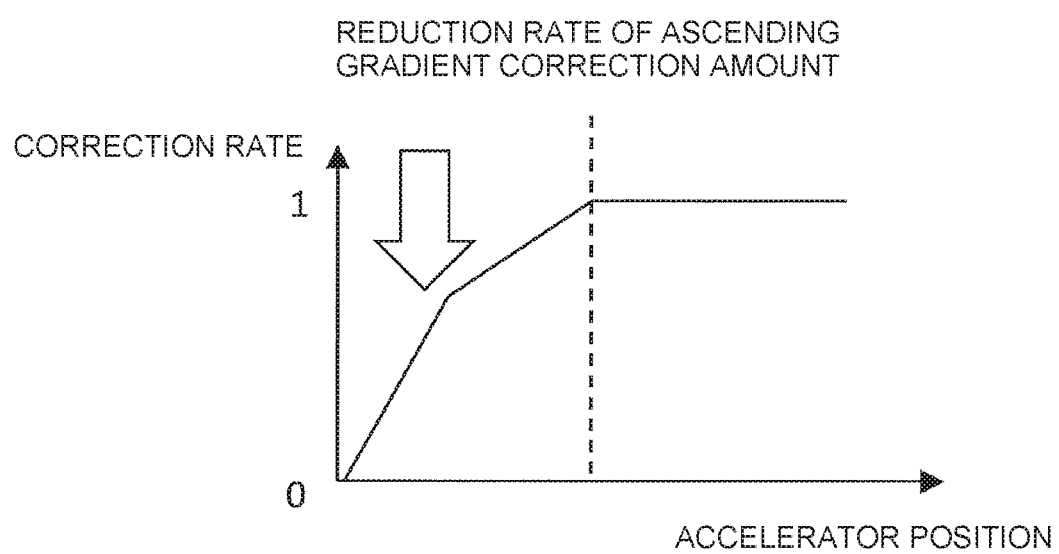
FIG. 11 is a view describing an example of a reduction rate of an ascending gradient correction amount.

FIG. 11 is a view describing the reduction rate of the ascending gradient correction amount according to the embodiment. A horizontal axis represents an accelerator position and a vertical axis represents a correction rate with respect to the basic gradient correction amount. A correction rate 1 shows a reduction rate of 0%, and a correction rate 0 shows a reduction rate of 100%. Also, a broken line in the drawing shows an accelerator position of the partial-state equivalent.

Therefore, as shown in FIG. 11, in the embodiment, when deceleration is requested and the accelerator position is thus smaller than the partial-state equivalent, the reduction rate of the ascending gradient correction amount becomes larger as the accelerator position becomes smaller. This means that, as the driver's deceleration request becomes larger, gradient assist torque that is reduced further from the basic gradient correction amount is calculated. When the accelerator position is larger than the partial-state equivalent (when acceleration is requested), the basic gradient correction amount is set as the gradient assist torque as it is.

Figure 12:
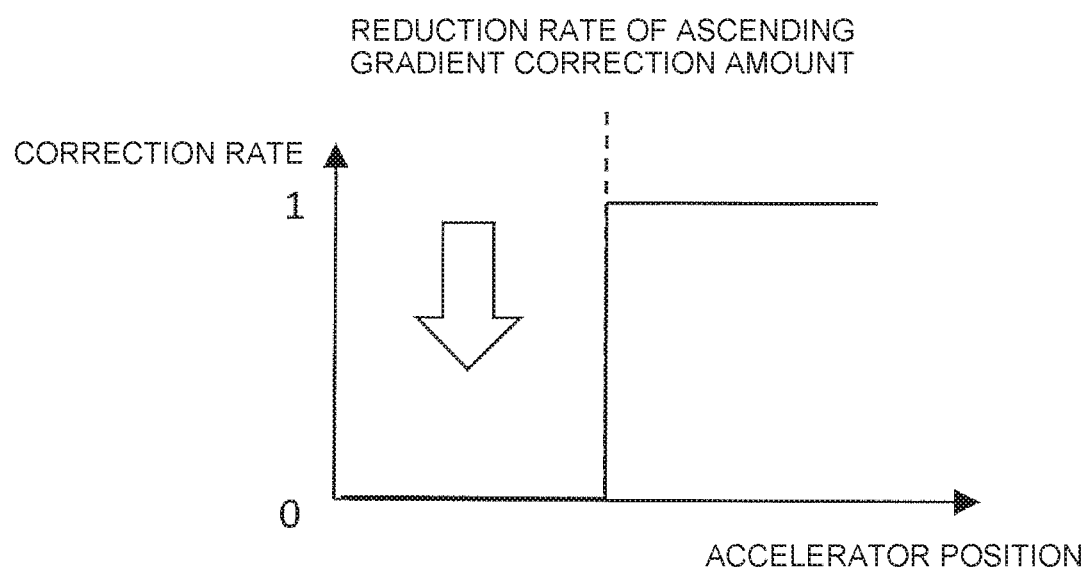
FIG. 12 is a view describing an example of a reduction rate of an ascending gradient correction amount.

However, the reduction rate of the ascending gradient correction amount shown in FIG. 11 is an example only, and, changes of the reduction rate of the ascending gradient correction amount is not particularly limited as long as the reduction rate of the ascending gradient correction amount becomes larger as the accelerator position becomes smaller. For example, as shown in FIG. 12, when the accelerator position is smaller than the partial-state equivalent, the reduction rate of the ascending gradient correction amount may be uniformly set to 100%.

Once the reduction rate of the ascending gradient correction amount is calculated, processing of step S911 is executed in which gradient assist torque is calculated by multiplying the calculated reduction rate of the ascending gradient correction amount by the basic gradient correction amount.

In step S908 shown in FIG. 9, the motor controller 2 determines whether or not a road surface is a downhill road (a descending gradient). Specifically, the motor controller 2 determines whether or not the basic gradient correction amount is smaller than 0. When the basic gradient correction amount is smaller than 0, it is determined that the road surface is a downhill road, and processing of next step S909 is executed. When the basic gradient correction amount is 0, it is determined that the road surface is equivalent to a flat road, and the processing of step S911 is thus executed in order to set the gradient assist torque to 0.

In step S909, the motor controller 2 determines whether or not the accelerator position is larger than the partial-state equivalent in order to detect a driver's acceleration request. When the accelerator position is larger than the partial-state equivalent, it is determined that the driver is requesting acceleration as described earlier. Therefore, processing of next step S910 is executed in order to calculate the reduction rate of the correction amount when acceleration is requested on a downhill road (a descending gradient). When the accelerator position is not larger than the partial-state equivalent, the processing of step S911 is executed in order to set the basic gradient correction amount as the gradient assist torque.

In step 910, the reduction rate of the correction amount when acceleration is requested on a downhill road (the reduction rate of a descending gradient correction amount) is calculated in order for the motor controller 2 to execute the gradient correction amount adjustment processing. Calculation of the reduction rate of the descending gradient correction amount is described with reference to FIG. 13.

Figure 13:
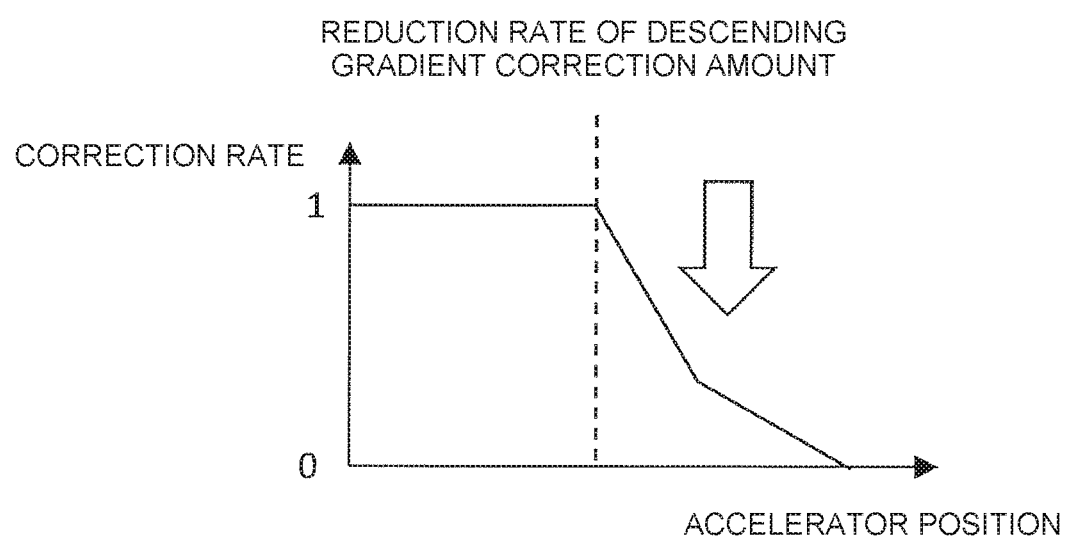
FIG. 13 is a view describing an example of a reduction rate of a descending gradient correction amount.

FIG. 13 is a view describing the reduction rate of the descending gradient correction amount according to the embodiment. Similarly to FIG. 11 and FIG. 12, a horizontal axis represents an accelerator position, and a vertical axis represents a correction rate with respect to the basic gradient correction amount. A correction rate 1 represents a reduction rate of 0%, and a correction rate 0 represents a reduction rate of 100%. Also, a broken line in the drawing represents an accelerator position of the partial-state equivalent.

Thus, as shown in FIG. 13, in this embodiment, when acceleration is requested and the accelerator position is thus larger than the partial-state equivalent, the reduction rate of the descending gradient correction amount becomes larger as the accelerator position becomes larger. This means that, as the driver's acceleration request becomes larger, gradient assist torque reduced further from the basic gradient correction amount is calculated. With the accelerator position smaller than the partial-state equivalent (when deceleration is requested), the basic gradient correction amount is set as the gradient assist torque as it is.

However, the reduction rate of the descending gradient correction amount shown in FIG. 13 is an example only, and changes of the reduction rate of the descending gradient correction amount are not particularly limited as long as the reduction rate of the ascending gradient correction amount becomes smaller as the accelerator position becomes larger. For example, as shown in FIG. 14, when the accelerator position is larger than the partial-state equivalent, the reduction rate of the descending gradient correction amount may be uniformly set to 100%.

Once the reduction rate of the descending gradient correction amount is calculated, the processing of step S911 is executed in which gradient assist torque is calculated by multiplying the calculated reduction rate of the descending gradient correction amount by the basic gradient correction amount.

Figure 14:
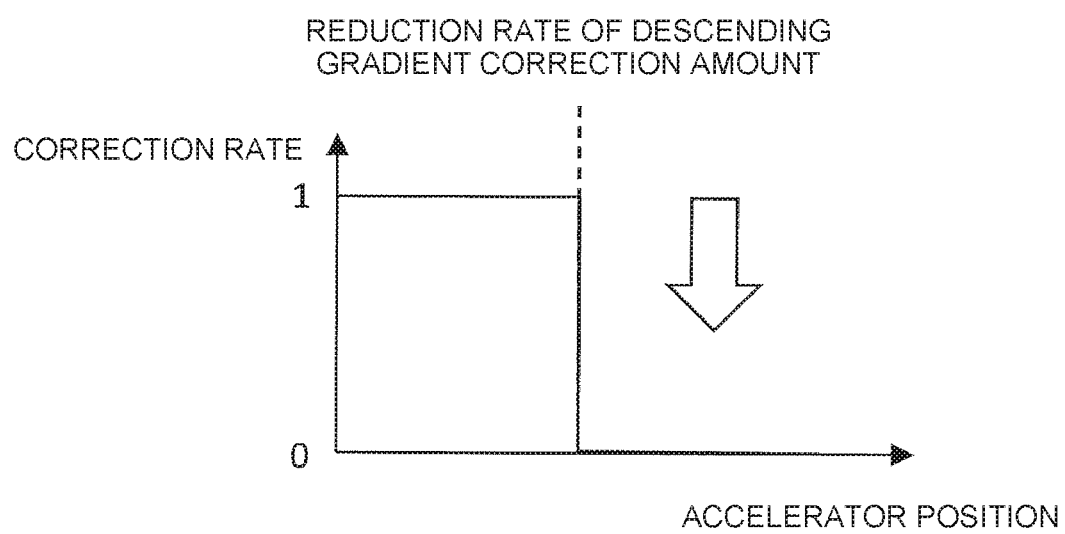
FIG. 14 is a view describing an example of a reduction rate of a descending gradient correction amount.

The reduction rates of the descending gradient correction amount shown in FIG. 13 and FIG. 14 do not need to be in similar proportion to the ascending gradient correction rates shown in FIG. 11 and FIG. 12, respectively. Even when the reduction rate of the gradient correction amount is the same, a driver may be given different degrees of sensuous influence by the gradient correction amount on an uphill road and a downhill road. Therefore, by differentiating the reduction rate of the gradient correction amount between an uphill road and a downhill road, it is possible to calculate optimized reduction rates individually so that a sense of discomfort given to a driver is restrained further.

Then, in step S911, the motor controller 2 calculates the gradient assist torque. In a case where the reduction rate of the ascending gradient correction amount or the reduction rate of the descending gradient correction amount is calculated on an upper stage of the flow, the gradient assist torque is calculated by multiplying the basic gradient correction amount by the calculated reduction rate of the ascending or descending gradient correction amount. Further, when it is determined on an upper stage of the flow that a road surface is equivalent to a flat road or that a traveling state of a vehicle is the partial state, the basic gradient correction amount is set as the gradient assist torque as it is. After the gradient assist torque is calculated, the motor controller 2 executes processing of next step S912.

In step S912, the motor controller 2 calculates the first target torque value Tm1*. To be more specific, as shown in FIG. 4, the first target torque value Tm1* is calculated by adding the target basic torque value Tm0* as driver request torque, and the gradient assist torque calculated in step S911. Then, during normal driving time when it is not just before stop of a vehicle, the first target torque value Tm1* is set to the motor torque command value Tm* (see FIG. 8).

Then, in step 913, the motor controller 2 executes torque control of the vehicle based on the driver's accelerator operation amount by controlling the motor 4 with the first target torque value Tm1* that is set as the motor torque command value Tm*.

How to calculate the gradient assist torque in the embodiment has been described so far. As the gradient assist torque is calculated as described above, the gradient correction amount is reduced by about half in the partial traveling state. Thus, the accelerator operation amount that realizes a driver's acceleration/deceleration request is reduced without giving the driver a sense of discomfort.

Further, even when a driver requests deceleration on an uphill road, the gradient correction amount is reduced further in accordance with the driver's deceleration request. Therefore, it is possible to restrain a sense of discomfort generated due to a difference between a deceleration expected value with respect to the driver's accelerator operation amount and actual deceleration generated in the vehicle.

Further, even when a driver requests acceleration on a downhill road, the gradient correction amount is reduced further in accordance with the driver's acceleration request. Thus, it is possible to restrain a sense of discomfort generated due to a difference between an acceleration expected value with respect to the driver's accelerator operation amount and actual acceleration generated in the vehicle.

As described so far, the electric vehicle control device according to the embodiment is a control device that includes the motor that gives braking force or driving force to a vehicle in accordance with an accelerator operation, and realizes an electric vehicle control method by which the braking force is controlled when an accelerator operation amount is smaller than a given value and the driving force is controlled when the accelerator operation amount is the given value or larger. The electric vehicle control device estimates disturbance torque that acts on the motor as resistance component relating to a gradient and executes correction by which the braking force or the driving force is increased or decreased so as to cancel the resistance component based on a disturbance torque estimated value. Then, it is determined whether or not the accelerator operation amount is a partial-state equivalent, and either when the accelerator operation amount is larger than the partial-state equivalent on a downhill road, or when the accelerator operation amount is smaller than the partial-state equivalent on an uphill road, the correction amount is reduced. Further, the partial-state equivalent is an accelerator operation amount by which the vehicle is not accelerated and decelerated.

Thus, even when a driver requests for acceleration on a gradient road, the gradient correction amount is reduced in accordance with a road surface gradient and the driver's acceleration/deceleration request. Therefore, it is possible to restrain a sense of discomfort generated when there is a difference between an acceleration/deceleration expected value with respect to the driver's accelerator operation amount and actual acceleration/deceleration generated in the vehicle.

Further, the electric vehicle control device according to the embodiment increases a reduction rate of a correction amount on a downhill road (a reduction rate of a descending gradient correction amount) as an accelerator operation amount increases. Thus, when a driver requests for acceleration on a downhill road, the gradient correction amount is reduced further as more acceleration is requested by the driver. Therefore, it is possible to further restrain a sense of discomfort generated when there is a difference between an acceleration expected value with respect to the driver's accelerator operation amount and actual acceleration generated in the vehicle.

Further, in the electric vehicle control device according to the embodiment, the reduction rate of the correction amount on an uphill road (a reduction rate of an ascending gradient correction amount) is increased as the accelerator operation amount becomes smaller. Thus, when a driver requests for deceleration on an uphill road, the gradient correction amount is reduced further as more deceleration is requested by the driver, thereby restraining a sense of discomfort generated when there is a difference between a deceleration expected value with respect to the driver's acceleration operation amount and actual deceleration generated in the vehicle.

Furthermore, in the electric vehicle control device according to the embodiment, the reduction rate of the correction amount on a downhill road and the reduction rate of the correction amount on an uphill road are set so as to be different from each other. Thus, even when a sense of discomfort given to a driver is different on downhill road from that on an uphill road, it is possible to calculate an appropriate gradient correction amount in accordance with each road surface. Therefore, it is possible to restrain a sense of discomfort given to a driver more appropriately according to a road surface state.

Moreover, in the electric vehicle control device according to the embodiment, the correction amount may be 0 (the reduction rate of the gradient correction amount may be 100%) when the accelerator operation amount is larger than the partial-state equivalent on a downhill road and when the accelerator operation amount is smaller than the partial-state equivalent on an uphill road. Thus, when there is a driver's request for acceleration/deceleration on a gradient road, the gradient correction amount becomes 0, and actual acceleration/deceleration generated to the vehicle is not different from an acceleration expected value with respect to the driver's accelerator operation amount. Therefore, it is possible to eliminate the sense of discomfort given to the driver due to the gradient correction.

The electric vehicle control device according to the embodiment of the present invention has been described so far. However, the present invention is not limited to the foregoing embodiment, and various modifications and applications are possible. For example, although the configuration of the control block for calculating the first target torque value Tm1* is described with reference to FIG. 4, it is not necessary to provide all of the components shown in FIG. 4, and, for example, the rate limiter 406 and the low pass filter 407 may be omitted.

Further, in the foregoing description, the driver's acceleration/deceleration request is determined by comparison between the accelerator position and the partial-state equivalent. However, a driver's acceleration/deceleration request may also be determined based on an amount of change of the accelerator position. For example, when the accelerator position is acquired and is larger than a value of the accelerator position that is previously acquired, then a driver's acceleration request can be determined based an amount of the change. Further, when the acquired accelerator position is smaller than the previously-acquired value, it is possible to determine a driver's deceleration request based on an amount of the change.

Further, the partial-state equivalent of the accelerator position may be changed in accordance with vehicle speed. For example, in the gradient correction amount adjuster 404, vehicle speed or a speed parameter proportional to vehicle speed may be further input, and the accelerator position of the partial-state equivalent may be increased when the vehicle speed is high, and may be reduced when the vehicle speed is low. Thus, it is possible to detect a driver's acceleration/deceleration request by using a more accurate partial-state equivalent of an accelerator position as an indicator.

Figure 15:
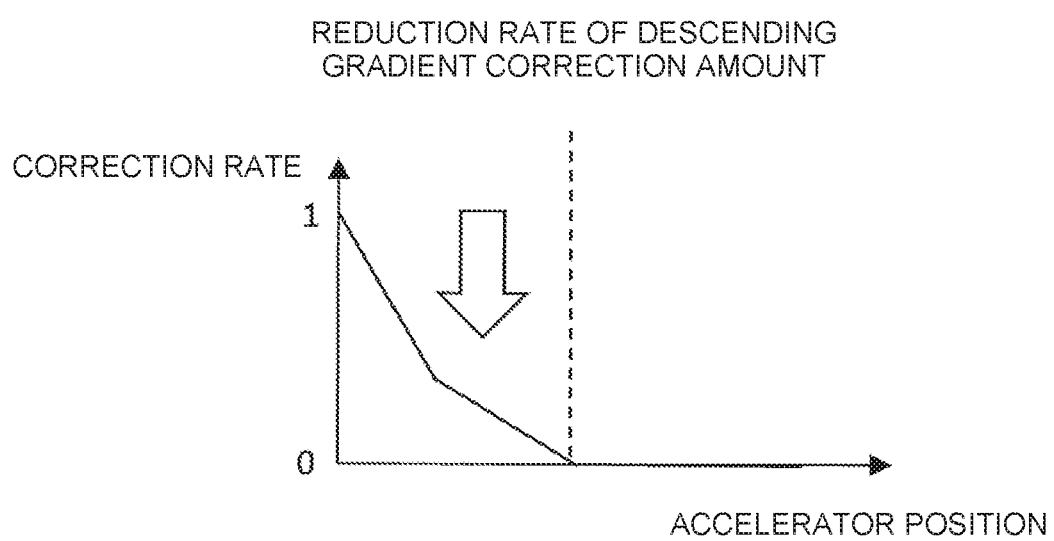
FIG. 15 is a view describing a modified example of a reduction rate of a descending gradient correction amount.

Furthermore, how to calculate the gradient assist torque described above does not necessarily require all of the steps shown in FIG. 10. For example, on a downhill road, the gradient correction amount may be reduced in accordance with an accelerator position even when deceleration is requested, without needing the determination of the driver's acceleration request on a downhill road described in step S909 in FIG. 10. In this case, for example, as shown in FIG. 15, the reduction rate of the descending gradient correction amount may be increased as the accelerator position becomes larger, and the reduction rate of the descending gradient correction amount may be set to 100% when the accelerator position becomes the partial-state equivalent.

Figure 16:
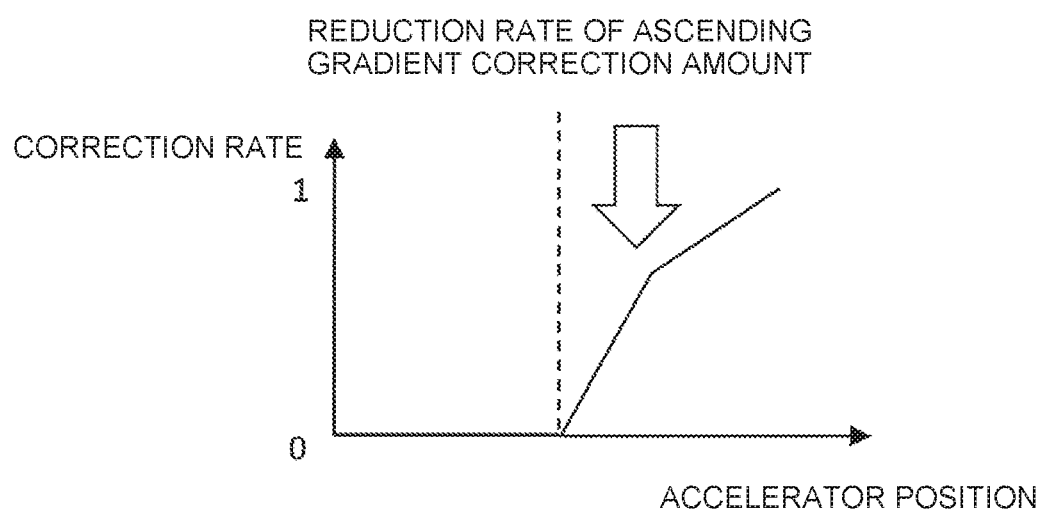
FIG. 16 is a view describing a modified example of a reduction rate of an ascending gradient correction amount.

Similarly, on an uphill road, the gradient correction amount may be reduced in accordance with an accelerator position even when the acceleration is requested, without needing the determination of the driver's deceleration request on an uphill road described in step S906 shown in FIG. 10. In such a case, for example, as shown in FIG. 16, the reduction rate of the ascending gradient correction amount may be reduced as the accelerator position becomes smaller, and the reduction rate of the ascending gradient correction amount may be set to 100% when the accelerator position becomes the partial-state equivalent.

Further, in the foregoing description, when the accelerator operation amount is the given value or smaller, and also it is just before stop of the electric vehicle, the stop control is executed by which the motor torque command value Tm* converges to the corrected disturbance torque estimated value Td (the disturbance assist torque) as rotation speed of the motor 4 is reduced. However, since speed parameters such as wheel speed, vehicle body speed, and rotation speed of the drive shaft have a proportional relation with rotation speed of the motor 4, the motor torque command value Tm* may converge to the disturbance torque estimated value Td as the speed parameters proportional to rotation speed of the motor 4 are lowered. Also, in the first place, it is not always necessary to execute the foregoing stop control just before stop of a vehicle, and the stop control processing according to step S203 in FIG. 2 may be omitted.

The invention claimed is:

1. A control method for an electric vehicle that is provided with a motor that gives braking force or driving force to the vehicle in accordance with an accelerator operation amount, controls the braking force when the accelerator operation amount is smaller than a given value, and controls the driving force when the accelerator operation amount is the given value or larger, the control method comprising:
   estimating disturbance torque that acts on the motor as a resistance component relating to a gradient;
   executing correction by which the braking force or the driving force is increased and decreased based on an estimated value of the disturbance torque so that a speed of the vehicle is maintained regardless of a road gradient when the accelerator operation amount is constant by canceling the resistance component;
   comparing a partial state equivalent and the accelerator operation amount that is acquired from a driver, wherein the partial state equivalent is an accelerator position which does not generate acceleration or deceleration of the electric vehicle and causes the electric vehicle to travel at a constant speed;
   determining the driver requests acceleration when the accelerator operation amount is larger than the partial state equivalent;
   determining the driver requests deceleration when the accelerator operation amount is smaller than the partial state equivalent;
   and
   reducing an amount of the correction when determining that the driver requests acceleration on a downhill road or when determining that the driver requests deceleration on an uphill road.

2. The control method for the electric vehicle according to claim 1 wherein a reduction rate of the correction amount on a downhill road is increased as the accelerator operation amount becomes larger.

3. The control method for the electric vehicle according to claim 1, wherein a reduction rate of the correction amount on an uphill road is increased as the accelerator operation amount becomes smaller.

4. The control method for the electric vehicle according to claim 1, wherein the reduction rate of the correction amount on a downhill road and the reduction rate of the correction amount on an uphill road are set so as to be different from each other.

5. The control method for the electric vehicle according to claim 1, wherein the correction amount is O when the accelerator operation amount is larger than the partial-state equivalent on a downhill road, and when the accelerator operation amount is smaller than the partial-state equivalent on an uphill road.

6. The control method for the electric vehicle according to claim 1, wherein requesting acceleration, requesting deceleration, and holding the partial state equivalent is based only on the accelerator position and the accelerator operation amount.

7. The control method for the electric vehicle according to claim 6, further comprising:
controlling the partial state equivalent by setting and holding the accelerator position, before estimating the disturbance torque and before executing the correction.

8. A control device for an electric vehicle that is provided with a motor that gives braking force or driving force to the vehicle in accordance with an accelerator operation amount, and a controller that controls the braking force when the accelerator operation amount is smaller than a given value, and controls the driving force when the accelerator operation amount is the given value or larger, wherein
the controller:
estimates disturbance torque that acts on the motor as a resistance component relating to a gradient;
executes correction by which the braking force or the driving force is increased and decreased based on an estimated value of the disturbance torque so that a speed of the vehicle is maintained regardless of a road gradient when the accelerator operation amount is constant by canceling the resistance component;
compare a partial state equivalent and the accelerator operation amount that is acquired from a driver, wherein the partial state equivalent is an accelerator position which does not generate acceleration or deceleration of the electric vehicle and causes the electric vehicle to travel at a constant speed;
determine the driver requests acceleration when the accelerator operation amount is larger than the partial state equivalent;
determine the driver requests deceleration when the accelerator operation amount is smaller than the partial state equivalent;
and
reducing an amount of the correction when determining that the driver requests acceleration on a downhill road or when determining that the driver requests deceleration on an uphill road.

9. The control device for the electric vehicle according to claim 8, wherein the controller requests acceleration, requests deceleration, and holds the partial state equivalent based only on the accelerator position and the accelerator operation amount.

10. The control device for the electric vehicle according to claim 9, wherein the controller further controls the partial state equivalent by setting and holding the accelerator position, before estimating the disturbance torque and before executing the correction.

* * * * *